US012681584B2

(12) United States Patent
Liu et al.

(10) Patent No.: US 12,681,584 B2
(45) Date of Patent: Jul. 14, 2026

(54) OBJECT MOVEMENT CONTROL METHOD, APPARATUS, AND DEVICE

(71) Applicant: Beijing Zitiao Network Technology Co., Ltd., Beijing (CN)

(72) Inventors: Chin-Wei Liu, Beijing (CN); Xiaolin Rao, Beijing (CN); Chi Fang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/350,911

(22) Filed: Jul. 12, 2023

(65) Prior Publication Data

US 2024/0028130 A1 Jan. 25, 2024

(30) Foreign Application Priority Data

Jul. 25, 2022 (CN) .......................... 202210878115.5

(51) Int. Cl.
*G06F 3/01* (2006.01)
*G06F 3/04815* (2022.01)
(Continued)

(52) U.S. Cl.
CPC .............. *G06F 3/017* (2013.01); *G06F 3/011* (2013.01); *G06F 3/04815* (2013.01);
(Continued)

(58) Field of Classification Search
CPC ......... G06V 40/28; G06F 3/011; G06F 3/017; G06F 3/04815; G06F 3/04842; G06F 3/0486
See application file for complete search history.

(56) References Cited

U.S. PATENT DOCUMENTS

2009/0055614 A1* 2/2009 Momose ............... G06F 13/102
345/173
2013/0283213 A1* 10/2013 Guendelman ......... G06F 3/0485
715/848
(Continued)

FOREIGN PATENT DOCUMENTS

CN 107896508 A 4/2018
CN 108491143 A 9/2018
(Continued)

OTHER PUBLICATIONS

China National Intellectual Property Administration, Office Action and Search Report Issued in Application No. 202210878115.5, Apr. 15, 2026, 16 pages.

*Primary Examiner* — Gene W Lee
(74) *Attorney, Agent, or Firm* — Alleman Hall LLP

(57) ABSTRACT

A method of object movement control is proposed. The method includes: in response to a hand gesture of a hand of a user being a predefined selection gesture, determining a target object corresponding to the hand gesture; in response to the hand gesture of the hand of the user changing to a predefined movement confirmation gesture, determining a target display position; and controlling the target object to be displayed at the target display position. Therefore, movement control of an object according to a hand gesture operation and "bare hand" control of an object can be achieved. This further enhances user experience of operations while improving the operation intelligence of object movement control.

20 Claims, 6 Drawing Sheets

EXTENDED REALITY SPACE    EXTENDED REALITY SPACE    EXTENDED REALITY SPACE

RAY TRAJECTORY MODEL

SELECTION GESTURE    SECOND PREDEFINED DRAG GESTURE    PREDEFINED FETCH GESTURE

(51) Int. Cl.
  G06F 3/04842 (2022.01)
  G06F 3/0486 (2013.01)
  G06V 40/20 (2022.01)

(52) U.S. Cl.
  CPC ........ G06F 3/04842 (2013.01); G06F 3/0486
    (2013.01); G06V 40/28 (2022.01)

(56)     References Cited

U.S. PATENT DOCUMENTS

| | | | |
|---|---|---|---|
| 2015/0248719 A1* | 9/2015 | Hansen .............. | G06Q 30/0627 |
| | | | 705/26.63 |
| 2018/0088663 A1 | 3/2018 | Zhang et al. | |
| 2021/0232232 A1* | 7/2021 | Wang ........................ | G06T 7/75 |
| 2021/0263593 A1 | 8/2021 | Lacey | |
| 2023/0325004 A1* | 10/2023 | Burns .................... | G06F 3/011 |
| | | | 345/156 |
| 2024/0201502 A1* | 6/2024 | Ito ............................ | G06F 3/01 |

FOREIGN PATENT DOCUMENTS

| | | |
|---|---|---|
| CN | 108958475 A | 12/2018 |
| CN | 110721470 A | 1/2020 |
| CN | 113126746 A | 7/2021 |
| CN | 114402290 A | 4/2022 |
| WO | 2022095674 A1 | 5/2022 |

* cited by examiner

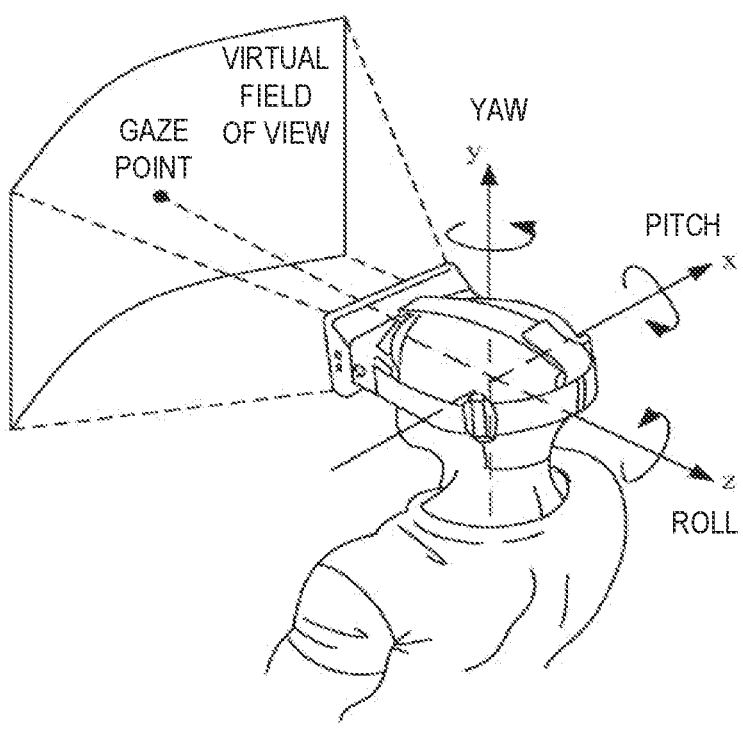

FIG. 1

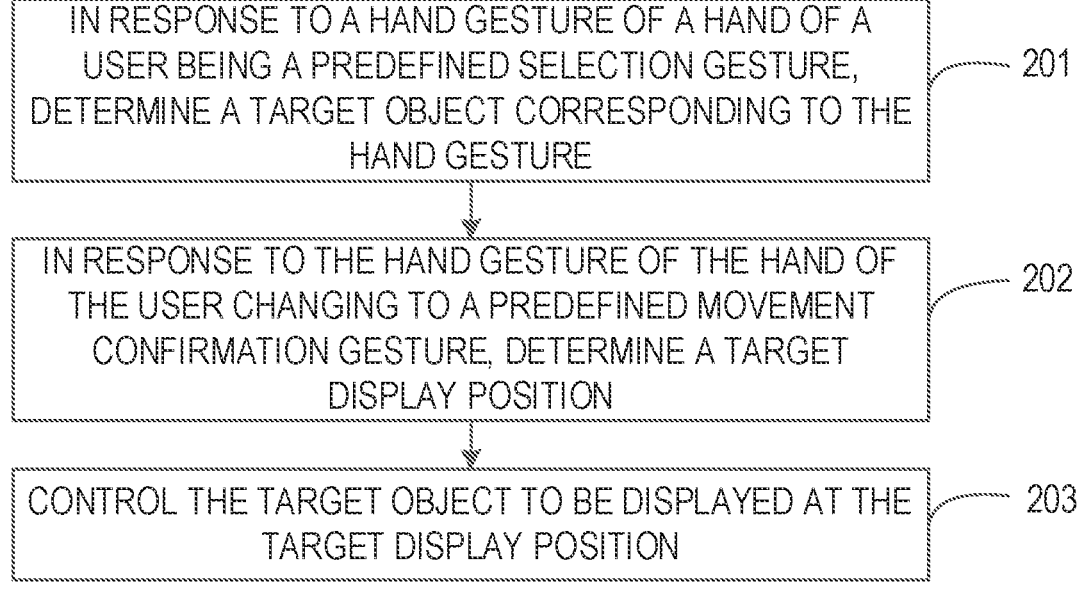

| |
|---|
| IN RESPONSE TO A HAND GESTURE OF A HAND OF A USER BEING A PREDEFINED SELECTION GESTURE, DETERMINE A TARGET OBJECT CORRESPONDING TO THE HAND GESTURE — 201 |
| IN RESPONSE TO THE HAND GESTURE OF THE HAND OF THE USER CHANGING TO A PREDEFINED MOVEMENT CONFIRMATION GESTURE, DETERMINE A TARGET DISPLAY POSITION — 202 |
| CONTROL THE TARGET OBJECT TO BE DISPLAYED AT THE TARGET DISPLAY POSITION — 203 |

FIG. 2

PREDEFINED
SELECTION GESTURE

PREDEFINED DRAG
GESTURE

OBJECT MOVEMENT CONTROL METHOD, APPARATUS, AND DEVICE

CROSS REFERENCE TO RELATED APPLICATIONS

The present application claims priority to Chinese Patent Application No. 202210878115.5, entitled "OBJECT MOVEMENT CONTROL METHOD, APPARATUS, AND DEVICE," filed on Jul. 25, 2022, the contents of which are hereby incorporated by reference in its entirety.

TECHNICAL FIELD

The present disclosure relates to the field of extended reality technology, and in particular, to a method, an apparatus, and a device for object movement control.

BACKGROUND

Extended Reality (XR) refers to a combination of reality and virtuality through a computer to create a virtual environment for human-computer interaction, which is also a general term of various technologies such as Augmented Reality (AR), Virtual Reality (VR), and Mixed Reality (MR). By integrating the three visual interaction technologies, it brings an immersive experience of a seamless transition between a virtual world and a real world to users. Improving intelligence of operations in extended reality scenarios has become a mainstream.

In related technologies, movement control of a relevant object in an extended reality scenario may be achieved based on a user's control operation of a control device, such as a control handle. However, the intelligence level of object control operations in such a way is not high enough, therefore there is a need for a more intelligent way of object movement control.

SUMMARY

In order to solve the above technical problems or at least partially solve the above technical problems, the present disclosure provides a method, an apparatus, and a device for object movement control, which achieves movement control of an object according to a gesture operation and "bare hand" control of the object. This improves the operation intelligence of movement control of the object, as well as further enhances user experience of operations.

The embodiments of the present disclosure provide a method of object movement control. The method comprises: in response to a hand gesture of a hand of a user being a predefined selection gesture, determining a target object corresponding to the hand gesture; in response to the hand gesture of the hand of the user changing to a predefined movement confirmation gesture, determining a target display position; and controlling the target object to be displayed at the target display position.

The embodiments of the present disclosure further provide an apparatus for object movement control. The apparatus comprises: an object determining module configured to, in response to a hand gesture of a hand of a user being a predefined selection gesture, determine a target object corresponding to the hand gesture; a display position determining module configured to in response to the hand gesture of the hand of the user changing to a predefined movement confirmation gesture, determine a target display position;

and a display controlling module configured to control the target object to be displayed at the target display position.

The embodiments of the present disclosure further provide an electronic device. The electronic device comprises: a processor; and a memory storing executable instructions by the processor; wherein the processor is configured to read the executable instructions from the memory and execute the executable instructions to implement the method of object movement control according to the embodiments of the present disclosure.

The embodiments of the present disclosure further provide an electronic device. The electronic device comprises: a computer-readable storage medium, wherein the computer-readable storage stores a computer program that implements the method of object movement control according to the embodiments of the present disclosure.

The embodiments of the present disclosure further provide a computer program product, comprising instructions which, when executed by a processor, implement the method of object movement control according to the embodiments of the present disclosure.

The technical solution provided by the embodiments of the present disclosure has the following advantages compared with the prior art.

In the object movement control solution provided by the embodiments of the present disclosure, a target object corresponding to the hand gesture is determined in response to a hand gesture of a hand of a user being a predefined selection gesture, and a target display position is determined in response to the hand gesture of the hand of the user changing to a predefined movement confirmation gesture. Then, the target object is controlled to be displayed at the target display position. As such, movement control of an object according to a hand gesture operation and "bare hand" control of an object can be achieved. This further enhances user experience of operations while improving the operation intelligence of object movement control.

BRIEF DESCRIPTION OF DRAWINGS

The above and other features, advantages, and aspects of the embodiments of the present disclosure will become more apparent in combination with the accompanying drawings and with reference to the following detailed description. In the drawings, the same or similar reference symbols refer to the same or similar elements. It is to be understood that the drawings are for illustrative purposes only and are not necessarily drawn to scale.

FIG. 1 shows a schematic diagram of an application scenario of a virtual reality device provided by the embodiments of the present disclosure;

FIG. 2 shows a schematic flowchart of a method of object movement control provided by the embodiments of the present disclosure;

DETAILED DESCRIPTIONS

Figure 3A:
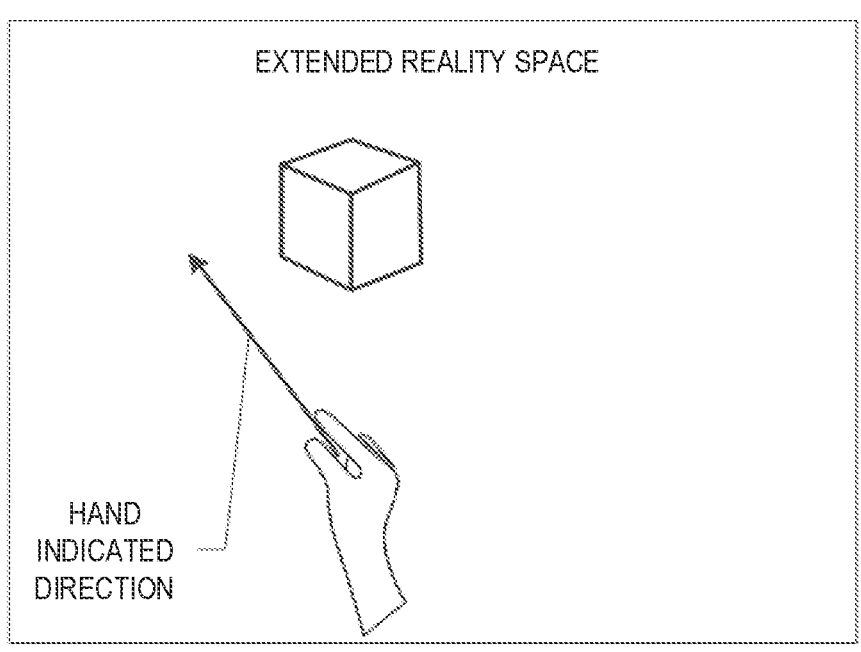
FIG. 3A shows a schematic diagram of a hand indicated direction provided by the embodiments of the present disclosure.

The embodiments of the present disclosure will be described in more detail below with reference to the accompanying drawings. Although some embodiments of the present disclosure are shown in the drawings, it is to be understood that the present disclosure can be implemented in various forms and should not be interpreted as limited to the embodiments described herein. On the contrary, these embodiments are provided for a more thorough and complete understanding of the present disclosure. It is to be understood that the drawings and embodiments of the present disclosure are only for illustrative purposes and are not intended to limit the scope of protection of the present disclosure.

It is to be understood that the steps described in the method embodiments of the present disclosure may be performed in different orders and/or in parallel. In addition, the method embodiments may include additional steps and/ or omit performing the illustrated steps. The protection scope of the present disclosure is not limited in this regard.

The term "include", "comprise", and variations used herein are open-ended inclusions, that is "including but not limited to." The term "based on" means "at least partially based on." The term "an embodiment" represents "at least one embodiment"; the term "another embodiment" represents "at least one additional embodiment"; and the term "some embodiments" represents "at least some embodiments." Relevant definitions of other terms will be given in the following description.

It should be noted that concepts such as "first," "second," or the like. mentioned in the present disclosure are only used to distinguish different devices, modules or units, and are not used to limit the order or interdependence relationship of functions performed by these devices, modules or units.

It should be noted that the modifications of "a", "an" and "a plurality of", or the like mentioned in the present disclosure are illustrative rather than restrictive, and those skilled in the art should understand that unless clearly specified in the context, otherwise these concepts should be understood as "one or more."

The names of messages or information exchanged between a plurality of devices in the embodiments of the present disclosure are only for illustrative purposes, and are not intended to limit the scope of these messages or information.

Some technical concepts or noun concepts mentioned in embodiments of the present disclosure are explained as follows:

AR: An AR scenery refers to a simulated scenery in which at least one virtual object is superimposed on a physical scenery or its representation. For example, an electronic system may have an opaque display and at least one imaging sensor which is used to capture images or videos of the physical scenery. These images or videos are representations of the physical scenery. The system combines the images or the videos with the virtual object and displays the combination on the opaque display. An individual uses the system to indirectly view the physical scenery via the images or videos of the physical scenery, and observes the virtual object superimposed on the physical scenery. When the system captures images of the physical scenery using one or more imaging sensors and displays an AR scenery on the opaque display using those images, the displayed images are referred to as video pass-through. Alternatively, the electronic system used to display the AR scenery may have a transparent or semi-transparent display, and an individual may directly view the physical scenery through the display. The system may display the virtual object on the transparent or semi-transparent display, allowing the individual to observe the virtual object superimposed on the physical scenery using the system. For example, the system may include a projection system that projects the virtual object onto the physical scenery. The virtual object may be projected onto a physical surface or as a hologram, allowing the individual to observe the virtual object superimposed on the physical scenery using the system. Specifically, it is a technology of computing camera gesture parameters of a camera in the real world (or a three-dimensional world, an actual world) in real time and adding the virtual object to the images captured by a camera according to the camera gesture parameter in the process of capturing images by the camera. The virtual object includes but is not limited to a three-dimensional model. The goal of the AR technology is to overlay the virtual world on the real world for interaction on the screen.

MR: MR creates an information loop for interactive feedbacks between the real world, the virtual world, and the user by presenting extended reality information in a real-world scenario, to enhance sense of reality of user experience. For example, computer-generated sensory input (such as the virtual object) may be integrated with a sensory input from the physical scenery or its representation in a simulated scenery, and in some MR sceneries, the computer-generated sensory input may adapt to changes in the sensory input from the physical scenery. Additionally, some electronic systems used to present MR sceneries may monitor an orientation and/or a position relative to the physical scenery, to allow the virtual object to interact with a real object (that is, a physical element or its representation from the physical scenery). For example, the system may monitor movement to make a virtual plant appears stationary relative to a physical building.

VR: VR is a technology that creates and experiences a virtual world, which may compute and generate a virtual environment. The virtual environment is multi-source information (the virtual reality herein at least includes visual perception, and may further include auditory perception, tactile perception, kinesthetic perception, and may even include gustatory perception and olfactory perception, or the like). An integrated and interactive three-dimensional dynamic visual scene and simulation of a physical behavior in a virtual environment may be realized, to make the user immerse in the simulated virtual reality environment, and applications in various virtual environments such as a map, a game, a video, education, medical treatment, a simulation, collaborative training, sales, assistance in manufacturing, maintenance, and repair may be realized.

A virtual reality device is a terminal that may achieve a virtual reality effect in VR, and is usually provided in a form of glasses, head mount display (HMD), or contact lenses, to realize visual perception and other forms of perception. It is to be understood that the forms of virtual reality devices are not limited to the above examples and can be further miniaturized or enlarged as needed.

The virtual reality device disclosed in the embodiments of the present disclosure may include but is not limited to the following types.

A PC-based virtual reality (PCVR) device, which uses PC end to perform related computations and data output for virtual reality functions. An external PCVR device uses data output from the PC end to achieve a virtual reality effect.

A mobile virtual reality device, which supports various ways (such as a head-mounted display with a dedicated card slot) to set up a mobile terminal (such as a smartphone). Through a wired connection or a wireless connection with the mobile terminal, related computations of virtual reality functions is performed by the mobile terminal, and outputs data to the mobile virtual reality device, for example, watching a virtual reality video through an APP of the mobile terminal.

An all-in-one virtual reality device, which has processors for performing related computations of virtual functions, thereby having independent virtual reality input and output functions without the need to be connected to the PC end or the mobile terminal, and having high degree of freedom of use.

An object, for example, an object performing interactions in an extended reality scenario, is controlled by a user or a robot program (such as an AI-based robot program). The object can be stationary, move, and perform various behaviors in an extended reality scenario, for example, may be a virtual person corresponding to a user in a virtual live streaming scenario.

Taking a VR scenario as an example, as shown in FIG. 1, the HMD is relatively light, comfortable in ergonomics, and provides contents with high-resolution and low latency. The virtual reality device is equipped with a gesture detection sensor (such as a nine-axis sensor) to detect gesture changes of the virtual reality device in real time. If a user wears the virtual reality device, the real-time gesture of the head of the user will be transmitted to the processor when the gesture of the head of the user changes, to compute a gaze point of the user in the virtual environment. An image within a gaze range of the user (that is, a virtual field of view) in the three-dimensional model of the virtual environment is computed according to the gaze point, and is displayed on the display, which provides an immersive experience as if the user is watching in a real environment.

In this embodiment, when the user wears the HMD device and opens a predefined application, such as a video live streaming application, the HMD device will run a corresponding virtual scene. The virtual scene may be a simulation environment of the real world, a semi-simulated and semi-fictional virtual scene, or a purely fictional virtual scene. The virtual scene may be a two-dimensional virtual scene, a 2.5-dimensional virtual scene, or any of three-dimensional virtual scenes. The embodiments of the present disclosure do not limit the dimension of the virtual scene. For example, the virtual scene may include a character, a sky, a land, an ocean, or the like. The land may include environmental elements such as a desert or a city. Users may control a relevant object in the virtual scene to move, and may interact with a control, a model, a display content, a character, and other objects in the virtual scene through ways such as a joystick device or a bare hand gesture.

As mentioned above, if a virtual object in an extended reality scene is controlled by a joystick device, the control is obviously not intelligent enough. Therefore, to further enhance a control experience, the present disclosure proposes a way to control movement of an object based on a bare hand gesture.

To solve the above problems, the embodiments of the present disclosure provide a method of object movement control, which will be described in detail below with specific embodiments.

FIG. 2 shows a schematic flowchart of a method of object movement control provided by the embodiments of the present disclosure. The method may be executed by an apparatus for object movement control. The apparatus may be implemented using a software and/or a hardware and is generally integrated into an electronic device. As shown in FIG. 2, the method comprises the following steps.

At step 201, in response to a hand gesture of a hand of a user being a predefined selection gesture, a target object corresponding to the hand gesture is determined.

The target object may be any object with a mobility attribute displayed in the extended reality scene, such as the aforementioned character(s), control(s), model(s), or the like.

In an embodiment of the present disclosure, a predefined selection gesture for selecting the target object is predetermined. After a detection that the hand gesture of the user matches the predefined selection gesture, the selected target object is determined to further control the selected target object.

During the actual execution process, in order to further intuitively indicate the selection process of the target object, a hand indicated direction corresponding to the hand gesture is determined. The hand indicated direction may be determined according to the position of finger(s) of the current hand gesture. For example, as shown in FIG. 3A, if the hand gesture is a "fetch gesture", the corresponding hand indicated direction may be the corresponding direction of a center point position of the thumb and the index finger.

Figure 3B:
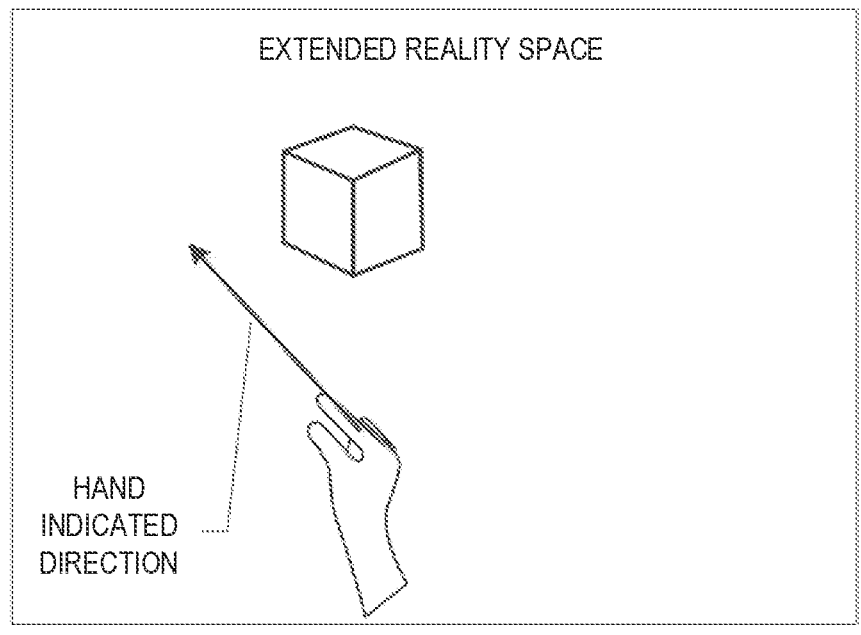
FIG. 3B shows a schematic diagram of another hand indicated direction provided by the embodiments of the present disclosure.

In further optional embodiments, the hand indicated direction may also be determined according to positions of some key points of a certain finger. For example, as shown in FIG. 3B, if the hand gesture is the "fetch gesture", the corresponding hand indicated direction may be determined by the positions of the key points corresponding to the last two joints of the index finger. In still further optional embodiments, the hand indicated direction may also be determined by other means, which are not listed here.

Furthermore, after the hand indicated direction corresponding to the hand gesture is determined, an object located in the hand indicated direction is determined as the target object. The target object may be understood as an object closest to the hand of the user in the hand indicated direction.

In some embodiments of the present disclosure, in order to provide an intuitive indication for the user to select the target object, a second direction indication model corresponding to the hand indicated direction may be displayed. The second direction indication model starts from a real-time hand position of the hand of the user and is displayed and extended along the hand indicated direction.

The second direction indication model is used to intuitively indicate the hand indicated direction corresponding to the current hand gesture, so that the user may adjust the hand position to select a desired target object. The second direction indication model may be any model that can provide a direction guidance function, including but not limited to a "ray trajectory model", an "arrow trajectory model", or the like. Still referring to FIG. 3A and FIG. 3B, the second direction indication model is a "ray trajectory model", which extends along the hand indicated direction from the hand position as the starting point, facilitating the user to know an object selection direction corresponding to the current hand gesture in the extended reality scene.

In order to further enhance an intuitive feeling of selecting the target object, after the target object is selected, the target object may be controlled to be displayed as in a selected state. The display of the target object in the selected state has a significant visual difference from that in the unselected state. The display mode corresponding to the selected state may be set according to requirements of the scene, including but not limited to highlighting the target object, displaying the text prompt "selected" above the target object, or the like.

Figure 4:
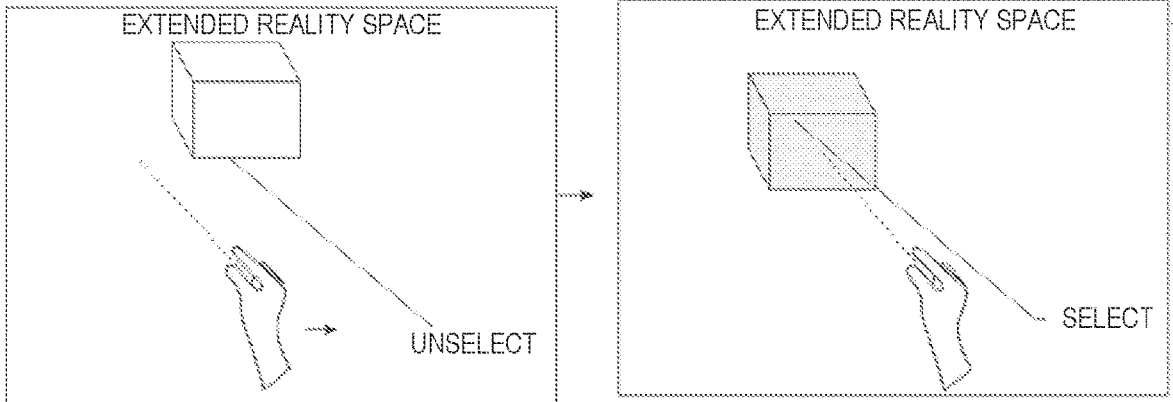
FIG. 4 shows a schematic diagram of displaying a selected object provided by the embodiments of the present disclosure.

In some possible embodiments, as shown in FIG. 4, if the target object is a "cube" which is selected, it may be displayed in a "highlighted" state (the "highlighted" state is indicated by an increase in a grayscale value in FIG. 4) to remind the user that the "cube" has been selected.

At step 202, in response to the hand gesture of the hand of the user changing to a predefined movement confirmation gesture, a target display position is determined.

At step 203, the target object to be displayed at the target display position is controlled.

It is to be understood that the predefined movement confirmation gesture is used to indicate the end of the movement of the target object. Therefore, in response to the hand gesture of the hand of the user changing to a predefined movement confirmation gesture, a target display position is determined. Because the target display position is associated with the hand gesture of the user, a visual effect of displaying the target object pulled by the "bare hand" of the user is achieved. The target object is switched to display at the target display position, achieving the movement control of the target object. This control method may be applied in scene building in a "game scene", or the like. Thus, the process of displaying the target object from being selected to moved may be achieved through a hand gesture operation without the need for a handle device, or the like, which expands the operation mode in the extended reality scene and enhances the operation intelligence.

In the method of object movement control in embodiments of the present disclosure, in response to a hand gesture of a hand of a user being a predefined selection gesture, a target object corresponding to the hand gesture is determined; in response to the hand gesture of the hand of the user changing to a predefined movement confirmation gesture, a target display position is determined; and the target object to be displayed at the target display position is controlled. In this way, movement control of an object according to the hand gesture operation and "bare hand" control of an object are achieved. This further enhances an operating experience of the user while improving the operation intelligence of object movement control.

When controlling the target object with a gesture as described above, in order to realize different control operation experiences, the ways for movement control may be divided into "quick fetch control", "drag control", or the like. The following examples illustrate the process of displaying the target object from the initial display position to the target display position in these two ways.

In an embodiment of the present disclosure, in the case that the movement control is in the way of "quick fetch control", if the target display position is determined in the aforementioned step 202, a current hand position of the hand of the user may be determined as the target display position in response to the hand gesture of the hand of the user changing to a predefined fetch gesture. The predefined fetch gesture may be any predefined hand gesture that signifies "fetch". In this embodiment, a "sudden" rapid transformation is performed to the target display position. After the hand gesture of the user is detected to be the predefined selection gesture, once the hand gesture of the user changes to the predefined fetch gesture, the current hand position of the hand of the user is determined as the target display position. Then the target object is displayed at the current hand position of the hand of the user, achieving the effect of "fetch" control of the target object.

Figure 5:
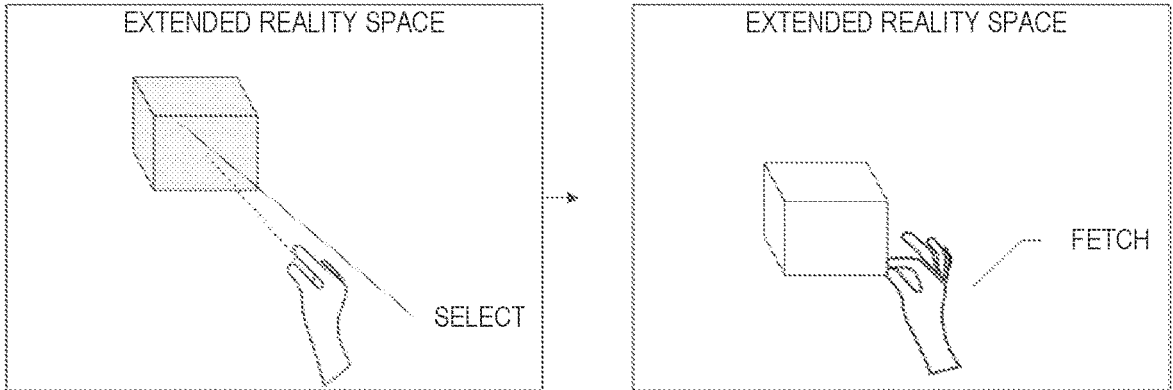
FIG. 5 shows a schematic diagram of a scenario of movement control of an object provided by the embodiments of the present disclosure.

For example, if the predefined selection gesture and the predefined fetch gesture are as shown in FIG. 5, the corresponding target object may be highlighted when the predefined selection gesture is detected. Then, after the hand gesture of the user changes to the predefined fetch gesture, the target object "cube" may be displayed on the hand of the user. As such, the visual effect of "fetching" the target object is achieved, which improves user experience of operations.

In an embodiment of the present disclosure, if the movement control is in the way of "drag control", in response to the hand gesture of the hand of the user being a predefined drag gesture and before the hand gesture of the hand of the user changes to the predefined movement confirmation gesture, a real-time movement displacement of the hand of the user is determined, and the target object is moved according to the real-time movement displacement.

That is, in this embodiment, in order to achieve a "drag" effect, the target object is moved along with the real-time movement of the hand of the user, achieving a visual effect of controlling a distant target object in close proximity. Because a real-time displacement is a vector with direction, the distance and direction of the movement of the target object both correspond to the real-time displacement of the hand of the user, achieving the "drag" effect of associated motions visually.

When moving the target object according to the real-time displacement of the hand of the user, the real-time displacement of the target object may be completely consistent with the real-time displacement of the hand of the user, and the real-time displacement of the target object may also maintain a fixed mapping relationship with the real-time displacement of the hand of the user. For example, if the real-time displacement of the hand of the user is a, the real-time displacement of the target object is 2a or the like, which suggests no limitations here.

Thus, during the determination of the target display position in the aforementioned step 202, in response to the hand gesture of the hand of the user changing to a predefined drag-release gesture, the current object position of the target object is determined as the target display position. The predefined drag-release gesture may be any predefined hand gesture action that signifies the end of "dragging". In this embodiment, after the hand gesture of the user changing to the predefined drag-release gesture is determined, the current object position that follows the real-time displacement of the hand of the user may be determined as the target display position, thereby achieving the "drag" movement control of the target object visually.

In some optional embodiments, during the determination of the target display position in the aforementioned step 202, in response to the hand gesture of the hand of the user changing to a predefined fetch gesture, the current hand position of the hand of the user may be determined as the target display position.

When moving the target object according to the real-time movement displacement, in order to further indicate that the target object is in motion, the target object can be controlled to be display as in a moving state. The moving state may be any display state that identifies that the target object is in motion, such as a "higher transparency" display state.

When moving the target object following the real-time hand position of the hand of the user, in order to further indicate that the target object is in motion, the "drag" movement process may also be indicated by displaying an animation, etc., to further enhance the user experience regarding controlling.

In some optional embodiments, in a case that the pre-defined drag gesture is a first predefined drag gesture (which may be any predefined hand gesture that identifies a hand gesture for dragging the target object), when moving the target object following the real-time hand position of the hand of the user, a predefined association model of the target object is displayed at a corresponding real-time hand position by following the real-time hand position of the hand of the user. The predefined association model may be a "pro-portional reduction" model of the target object or any other predefined model corresponding to the target object, such as just a "sphere" model. The predefined association model has a visual correspondence with the target object, and the user may visually perceive the predefined association model as a "shadow" model of the target object.

To enhance the visual association between the predefined association model and the target object, an association animation for the predefined association model and the target object is displayed in real-time between the predefined association model and the target object during the entire "drag" movement process. The association animation may be flexibly set according to the scene, such as a "mapping projection" animation, a "bubble emission" animation, or the like.

To illustrate the entire movement control process of the target object using the first predefined drag gesture more intuitively, a specific application scenario is used as an example.

Figure 6A:
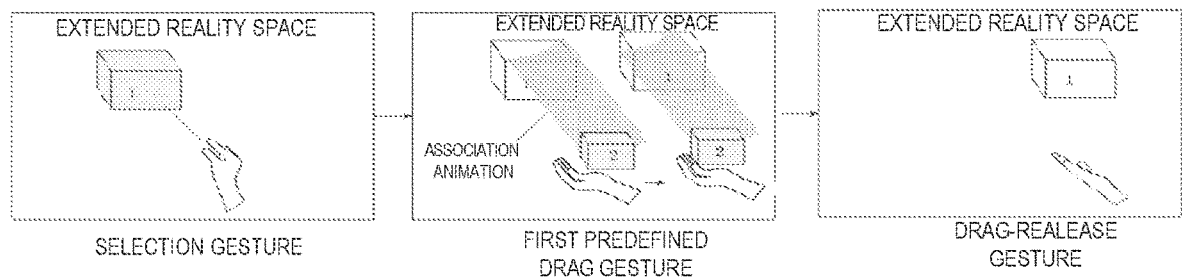
FIG. 6A shows a schematic diagram of another scenario of movement control of an object provided by the embodiments of the present disclosure.

In this embodiment, as shown in FIG. 6A, in response to the hand gesture of the hand of the user being the selection gesture in the figure and the determined target object is a "cube 1", when the first predefined drag gesture is a hand gesture where all fingers in the figure are kept together and all fingers of the user are detected to be kept together, the predefined association model of the target object is dis-played at the corresponding real-time hand position by following the real-time hand position of the hand of the user. The predefined association model is a proportionally reduced a "cube 2" in the figure. An association animation is displayed between the "cube 1" and the "cube 2", which is the "mapping animation" between the "cube 1" and the "cube 2" as shown in the figure. As shown, the transparency of the "cube 1" is higher in the moving state, and the "cube 1" is "highlighted" in the selected state.

After the hand gesture of the user is detected to change to the predefined drag-release gesture, the "mapping anima-tion" and the "cube 2" are no longer displayed, and the "cube 1" is restored to the initial display state. The current position of the target object is determined as the target display position, thereby an experience of near control of the distant "cube 1" is achieved based on the display of the "cube 2".

In some optional implementations, in a case that the predefined drag gesture is a second predefined drag gesture (which may be any other predefined hand gesture that identifies a gesture for dragging the target object), when moving the target object following the real-time hand posi-tion of the hand of the user, a first direction indication model is displayed in real-time between the hand of the user and the target object.

A starting point of the first direction indication model corresponds to a real-time hand position of the hand of the user. For example, the starting point of the first direction indication model is set at the real-time hand position of the hand of the user, or a position that is related to the real-time hand position of the hand of the user. An end point of the first direction indication model corresponds to a real-time object position of the target object. For example, the end point of the first direction indication model is set at the real-time object position of the target object, or a position that is related to the real-time object position of the target object.

Because the starting point of the first direction indication model corresponds to the real-time hand position of the hand of the user, and the end point of the first direction indication model corresponds to the real-time object position of the target object, the first direction indication model is always displayed between the hand of the user and the target object during the process of "dragging" the target object, achieving the visual effect of "pulling" to drag. The first direction indication model may be any predefined model that has the visual effect of "pulling" to drag, such as a "ray trajectory model".

To illustrate the entire movement control process of the target object using the second predefined drag gesture more intuitively, a specific application scenario is used as an example.

Figure 6B:
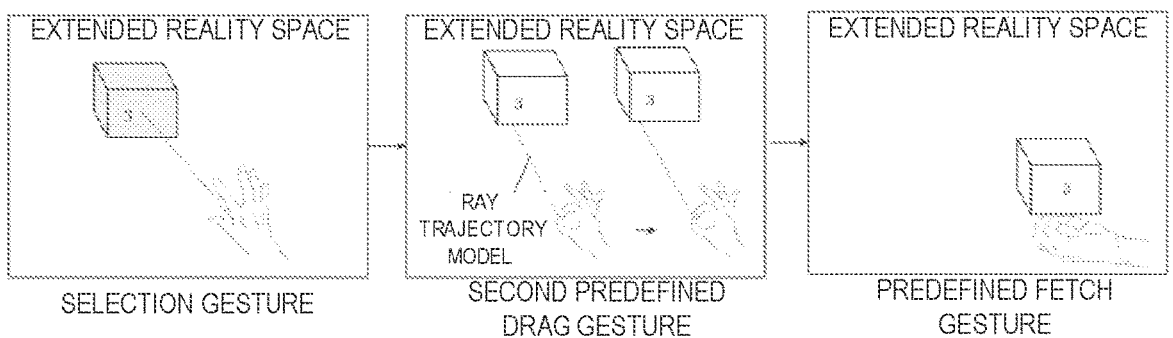
FIG. 6B shows a schematic diagram of another scenario of movement control of an object provided by the embodiments of the present disclosure.

In this embodiment, as shown in FIG. 6B, in response to the hand gesture of the hand of the user being the selection gesture in the figure and the determined target object is a "cube 3", when the second predefined drag gesture is a hand gesture where the index finger and the thumb in the figure are pinched together and the index finger and the thumb of the user are detected to pinched together, the "ray trajectory model" is displayed following the real-time hand position and the real-time object position of the "cube 3". The "ray trajectory model" is the aforementioned first direction indi-cation model. The starting point of the "ray trajectory model" is located at the real-time hand position, and the end point of the "ray trajectory model" is located at the real-time object position. The transparency of the "cube 3" is higher in the moving state, and the "cube 3" is "highlighted" in the selected state.

After detecting that the hand gesture of the hand of the user changing to the predefined fetch gesture, the "3" is no longer controlled to display as in the moving state, and the "Cube 3" is restored to its initial display state. The current hand position is determined as the target display position, thereby an experience of near control of the distant the "Cube 3" is achieved.

It is to be understood that the predefined selection gesture, the predefined movement confirmation gesture (including the predefined fetch gesture or the predefined drag-release gesture), and the predefined drag gesture mentioned in the embodiments of the present disclosure may be flexibly set according to the needs of the scene.

In some possible embodiments, hand gestures are different from each other. To avoid misjudgment, a corresponding hand gesture operation has a requirement of an identification time order. When a corresponding hand gesture action is identified in a corresponding identification time order, it can be determined that the corresponding hand gesture is effectively identified. For example, the identification time order of the predefined movement confirmation gesture is after identifying the predefined selection gesture, that is, if the corresponding hand gesture action of the predefined movement confirmation gesture is identified after identifying the predefined selection gesture, it is determined that the predefined movement confirmation gesture has been effectively obtained. The identification time order of the predefined drag gesture is after the predefined selection gesture and before the predefined movement confirmation gesture (such as the predefined drag-release gesture), that is, after identifying the predefined selection gesture and before identifying the predefined movement confirmation gesture, the predefined drag gesture is determined to be effectively obtained if a hand gesture action corresponding to the predefined drag gesture is identified.

In some possible embodiments, some of the hand gestures may be the same. Similarly, in this embodiment, in order to avoid misjudgment, there is a need for identification time orders of corresponding hand gesture operations. When a corresponding hand gesture action is identified at the corresponding identification time order, it can be determined that the corresponding hand gesture is effectively identified. In this embodiment, in order to differentiate different hand gestures and improve an accuracy of object movement control, hand gestures at adjacent identification time orders are different. For example, in some application scenarios, the corresponding hand gestures at identification time orders from front to back are the predefined selection gesture, the predefined drag gesture, and the predefined movement confirmation gesture (including the predefined fetch gesture or the predefined drag-release gesture). The predefined selection gesture and the predefined movement confirmation gesture may be the same, the predefined drag gesture is different from the adjacent predefined selection gesture, and the predefined drag gesture is also different from the adjacent predefined movement confirmation gesture. The process of identifying the corresponding gesture in the corresponding identification time order may refer to the above embodiment and will not be elaborated here. The method of object movement control in the embodiments of the present disclosure may flexibly control the movement of the target object through hand gestures according to the scene requirements, which expands the control method of the object and improves the intelligent experience of control.

Based on the above embodiments, a hand gesture of the hand of the user is identified before controlling the movement according to the hand gesture, for example, in response to the hand gesture of the hand of the user being the predefined selection gesture, and in response to the hand gesture of the hand of the user changing to the predefined movement confirmation gesture.

It is to be understood that there are different ways of identifying the hand gesture of the user in different application scenarios, as shown in the following examples.

In some optional embodiments, a hand image for the hand of the user is captured, such as the hand image within the line of sight of the camera is captured through a virtual reality device, etc. The hand gesture is identified according to the hand image. In this embodiment, the hand gesture may be identified based on an image recognition method.

Figure 7:
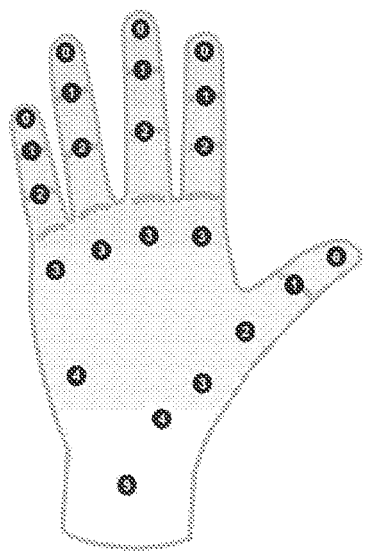
FIG. 7 shows a schematic diagram of positions of key points of a hand provided by the embodiments of the present disclosure.

In some optional embodiments, hand key points are predefined. For example, as shown in FIG. 7, the hand key points are defined according to positions of joint points for the hand of the user. Positions of the hand key points for the hand of the user may be identified, and the hand gesture may be identified according to the positions of the hand key points.

A position relationship of the hand key points may be set according to a predefined hand gesture that indicates controlling the target object. As such, the hand gesture may be identified according to the positions of the hand key points.

Figure 8:
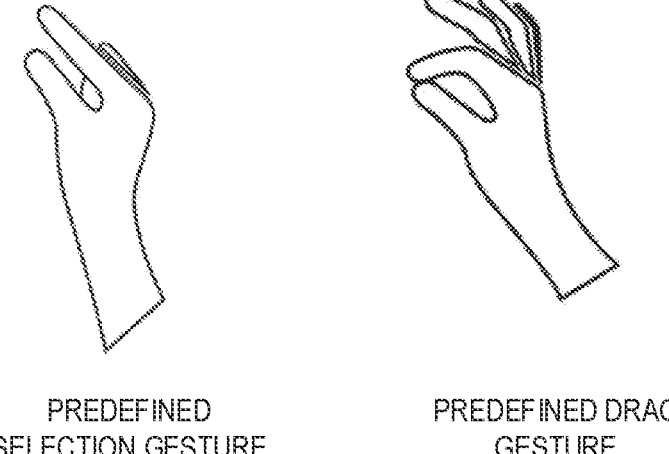
FIG. 8 shows a schematic diagram of hand gestures provided by the embodiments of the present disclosure.
Figure 9:
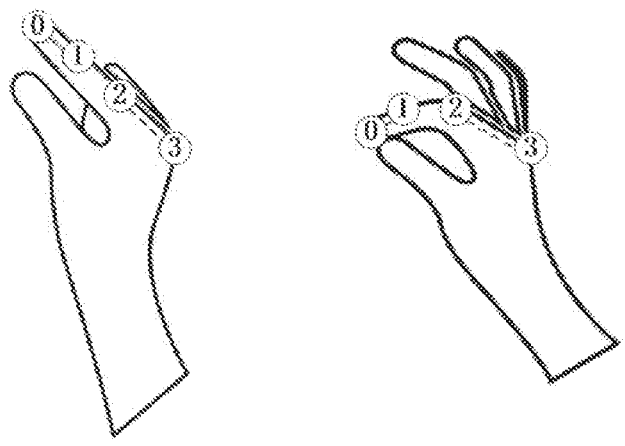
FIG. 9 shows a schematic diagram for indicating degrees of bending corresponding to key points of a hand provided by the embodiments of the present disclosure.

In some possible embodiments, if the hand gesture that controls the target object is related to a degree of bending for a first predefined finger and an interphalangeal distance between the first predefined finger and a second predefined finger. For example, the first predefined finger is the index finger, and the second predefined finger is the thumb. As shown in FIG. 8, the predefined selection gesture is a hand gesture with a larger distance between a finger and the thumb, and a smaller degree of bending for the index finger; and the predefined drag gesture is a hand gesture with a large degree of bending for the index finger, and an overlap between a finger and the thumb. In this embodiment, the degree of bending for the first predefined finger of the hand of the user is determined according to the positions of hand key points. For example, as shown in FIG. 9, the angle between the line where a finger key point 0 and a finger key point 1 of the first predefined finger are located and the line where a finger key point 2 and a finger key point 3 of the first predefined finger are located may be the degree of bending for the first predefined finger (only the line where the finger key point 0 and the finger key point 1 is located and the line where the finger key point 2 and the finger key point 3 is located are shown in the figure).

In this embodiment, a key point distance between an interphalangeal key point of the first predefined finger and an interphalangeal key point of the second predefined finger is determined according to the positions of hand key points.

The method of object movement control in the embodiments of the present disclosure may flexibly choose a way of identifying a hand gesture according to the scene requirements, which further improves the flexibility of movement control based on the hand gesture.

To implement the above embodiments, an apparatus for object movement control is also proposed in the present disclosure.

Figure 10:
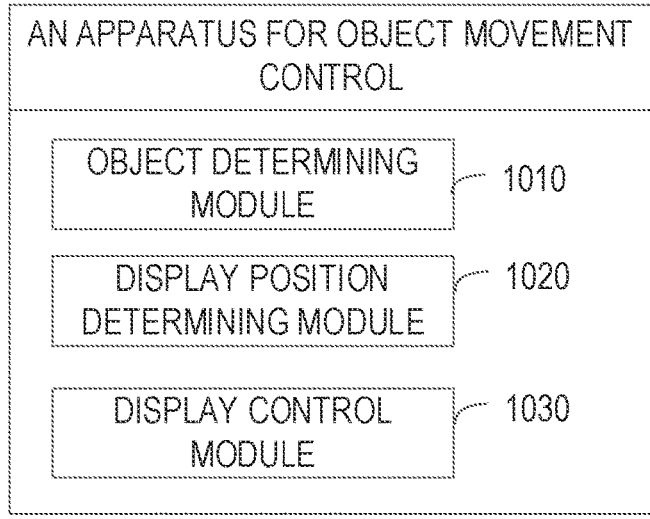
FIG. 10 shows a structural schematic diagram of an apparatus for object movement control provided by the embodiments of the present disclosure.

FIG. 10 shows a structural schematic diagram of an apparatus for object movement control provided by the embodiments of the present disclosure. The apparatus may be implemented by a software and/or a hardware and is generally integrated in an electronic device to achieve the object movement control. As shown in FIG. 10, the apparatus includes an object determining module 1010, a display position determining module 1020, and a display controlling module 1030.

The object determining module 1010 is configured to determine a target object corresponding to the hand gesture in response to a hand gesture of a hand of a user being a predefined selection gesture.

The display position determining module 1020 is configured to determine a target display position in response to the hand gesture of the hand of the user changing to a predefined movement confirmation gesture.

The display controlling module 1030 is configured to control the target object to be displayed at the target display position.

The apparatus for object movement control provided by the embodiments of the present disclosure may execute the method of object movement control provided by any of the embodiments of the present disclosure and has functional modules and beneficial effects corresponding to the execution of the method, which will not be elaborated here.

In order to implement the above embodiments, a computer program product is also proposed by the present disclosure. The computer program product comprises a computer program/instructions which, when executed by a processor, implement the method of object movement control in the aforementioned embodiments.

Figure 11:
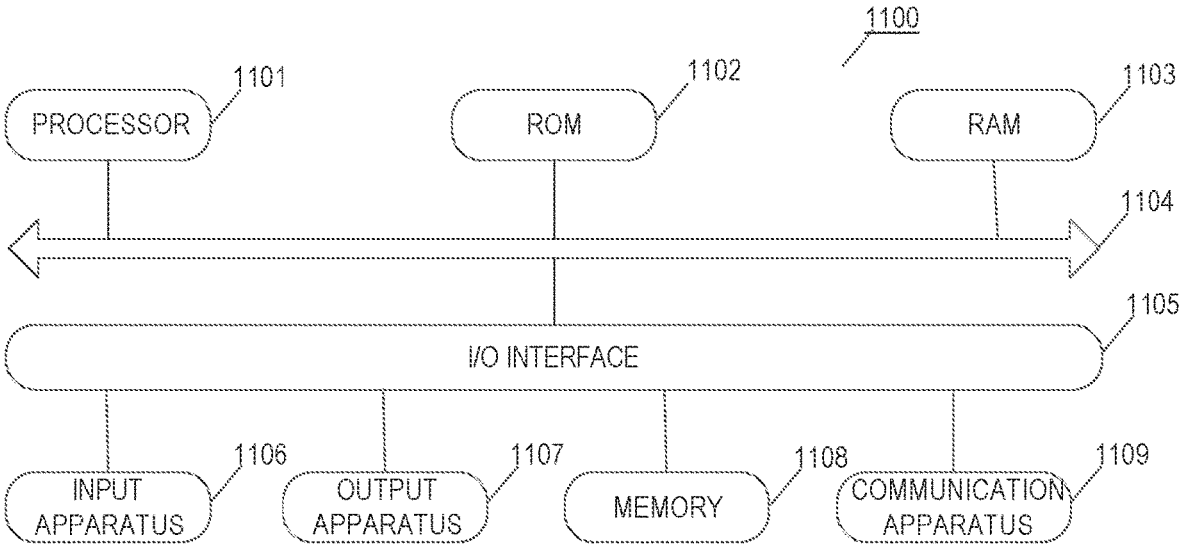
FIG. 11 shows a structural schematic diagram of an electronic device provided by the embodiments of the present disclosure.

FIG. 11 shows a structural schematic diagram of an electronic device provided by the embodiments of the present disclosure.

Referring specifically to FIG. 11, it shows a structural schematic diagram of an electronic device 1100 suitable for implementing the embodiments of the present disclosure. The electronic device 1100 in the embodiments of the present disclosure may include, but is not limited to, a mobile terminal such as a mobile phone, a laptop, a digital broadcast receiver, a personal digital assistant (PDA), a tablet, a portable multimedia player (PMP), and a vehicle-mounted terminal (such as a vehicle-mounted navigation terminal), as well as a fixed terminal such as a digital TV and a desktop computer. The electronic device shown in FIG. 11 is only an example and should not impose any limitations on the functions and scopes of usage of the embodiments of the present disclosure.

As shown in FIG. 11, the electronic device 1100 may include a processor (such as a central processor unit, a graphics processor unit, etc.) 1101, which may perform various appropriate actions and processes according to a program stored in a read-only memory (ROM) 1102 or loaded from a memory 1108 into a random access memory (RAM) 1103. Various programs and data required for the operations of the electronic device 1100 are also stored in the RAM 1103. The processor 1101, ROM 1102, and RAM 1103 are connected to each other via a bus 1104. An input/output (I/O) interface 1105 is also connected to the bus 1104.

Typically, the following apparatus may be connected to the I/O interface 1105: an input apparatus 1106 such as a touch screen, a touchpad, a keyboard, a mouse, a camera, a microphone, an accelerometer, a gyroscope, or the like; an output apparatus 1107 such as an liquid crystal display (LCD), a speaker, a vibrator, or the like; a memory 1108 such as a magnetic tape, a hard disk, or the like; and a communication apparatus 1109. The communication apparatus 1109 may allow the electronic device 1100 to communicate with other devices to exchange data through wired or wireless communication. Although FIG. 11 shows an electronic device 1100 with various apparatus, it is to be understood that it is not required to implement or possess all the illustrated apparatus. Alternatively, more or fewer apparatus may be implemented or possessed in the electronic device.

In particular, according to the embodiments of the present disclosure, the process described above with reference to the flowchart may be implemented as a computer software program. For example, the embodiments of the present disclosure include a computer program product which comprises a computer program stored on a non-transitory computer-readable medium. The computer program comprises instructions for implementing the method illustrated in the flowchart. In such embodiments, the computer program may be downloaded from the network and installed through the communication apparatus 1109, or installed from the memory 1108 or the ROM 1102. When the computer program is executed by the processor 1101, the aforementioned functions specified in the method of object movement control in the embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus, or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate, or transmit a program used by or in combination with an instruction execution system, apparatus, or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The aforementioned computer-readable medium may be included in the aforementioned electronic devices, or may also exist separately without being assembled into the electronic device.

The aforementioned computer-readable medium carries one or more programs which, when executed by the electronic device, cause the electronic device to: determine a target object corresponding to the hand gesture in response to a hand gesture of a hand of a user being a predefined selection gesture; determine a target display position in response to the hand gesture of the hand of the user changing to a predefined movement confirmation gesture; and control the target object to be displayed at the target display position. Therefore, movement control of an object according to the hand gesture operation and "bare hand" control of an object can be achieved. This further enhances an operating experience of the user while improving the operation intelligence of object movement control.

The electronic device may be programmed to execute the computer program code for performing the operations disclosed herein using one or more programming languages or combinations thereof. The aforementioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus, or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

The above description is merely a preferred embodiment of the present disclosure and an illustration of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, other technical solutions formed by any combination of the above-mentioned technical features or their equivalents, such as technical solutions which are formed by replacing the above-mentioned technical features with the technical features disclosed in the present disclosure (but not limited to) with similar functions.

Additionally, although operations are depicted in a particular order, it should not be understood that these operations are required to be performed in a specific order as illustrated or in a sequential order. Under certain circumstances, multitasking and parallel processing may be advantageous. Likewise, although the above discussion includes several specific implementation details, these should not be interpreted as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combinations.

Although the subject matter has been described in language specific to structural features and/or method logical actions, it is to be understood that the subject matter defined in the appended claims is not necessarily limited to the specific features or actions described above. Rather, the specific features and actions described above are merely example forms of implementing the claims.

The invention claimed is:

1. A method of object movement control, comprising:
in response to a hand gesture of a hand of a user being a predefined selection gesture, determining a target object corresponding to the hand gesture, a corresponding operation for the hand gesture having a requirement of an identification time order;
in response to the predefined selection gesture being detected, displaying, adjacent to the hand of the user, a visual cue indicating that the target object is selected;
in response to the hand gesture of the hand of the user changing to a predefined movement confirmation gesture that indicates an end of a movement of the target object, determining a target display position, the determination of the target display position comprising:
in response to the hand gesture of the hand of the user changing to a predefined fetch gesture, determining that a current hand position of the hand of the user is the target display position;
displaying the target object at the current hand position of the hand of the user, achieving a visual effect of fetch controlling of the target object by a sudden rapid transformation of the target display position from an initial display position of the target object to the current hand position of the hand of the user; and restoring the target object to an initial display state, wherein in response to the predefined movement confirmation gesture being identified after identifying the predefined selection gesture, determining that the predefined movement confirmation gesture has been effectively obtained and determining the end of the movement.

2. The method according to claim 1, wherein before in response to the hand gesture of the hand of the user changing to the predefined movement confirmation gesture, the method further comprises:

in response to the hand gesture of the hand of the user being a predefined drag gesture, determining a real-time movement displacement of the hand of the user; and moving the target object according to the real-time movement displacement.

3. The method according to claim 2, wherein moving the target object according to the real-time movement displacement further comprises:

controlling the target object to be displayed as in a moving state.

4. The method according to claim 2, wherein in a case that the predefined drag gesture is a first predefined drag gesture, moving the target object according to the real-time movement displacement further comprises:

displaying a predefined association model of the target object at a corresponding real-time hand position by following a real-time hand position of the hand of the user; and displaying, between the predefined association model and the target object, an association animation for the predefined association model and the target object in real-time.

5. The method according to claim 2, wherein in a case that the predefined drag gesture is a second predefined drag gesture, moving the target object according to the real-time movement displacement further comprises:

displaying, between the hand of the user and the target object, a first direction indication model in real-time, wherein a starting point of the first direction indication model corresponds to a real-time hand position of the hand of the user, and an end point of the first direction indication model corresponds to a real-time object position of the target object.

6. The method according to claim 1, wherein before in response to the hand gesture of the hand of the user being the predefined selection gesture, and before in response to the hand gesture of the hand of the user changing to the predefined movement confirmation gesture, the method further comprises:

identifying the hand gesture of the hand of the user.

7. The method according to claim 6, wherein identifying the hand gesture of the hand of the user comprises:

capturing a hand image for the hand of the user, and identifying the hand gesture according to the hand image.

8. The method according to claim 6, wherein identifying the hand gesture for the hand of the user comprises:

identifying positions of hand key points for the hand of the user, and identifying the hand gesture according to the positions of hand key points.

9. The method according to claim 8, wherein identifying the hand gesture according to the positions of hand key points comprises:

determining, according to the positions of hand key points, a degree of bending for a first predefined finger of the hand of the user;

determining, according to the positions of hand key points, a key point distance between an interphalangeal key point of the first predefined finger and an interphalangeal key point of the second predefined finger; and identifying the hand gesture according to the degree of bending and the key point distance.

10. The method according to claim 1, wherein after determining the target object corresponding to the hand gesture, the method further comprises:

controlling the target object to be displayed as in a selected state.

11. The method according to claim 1, further comprising:

in response to the hand gesture of the hand of the user changing to a predefined drag-release gesture, determining that a current object position of the target object is the target display position.

12. The method according to claim 1, wherein determining the target object corresponding to the hand gesture comprises:

determining a hand indicated direction corresponding to the hand gesture; and determining the target object located in the hand indicated direction.

13. The method according to claim 12, further comprising:

displaying a second direction indication model corresponding to the hand indicated direction, wherein the second direction indication model starts from a real-time hand position of the hand of the user, and is displayed and extended along the hand indicated direction.

14. An electronic device, comprising:

a processor; and a memory storing executable instructions by the processor, the processor being configured to read the executable instructions from the memory and execute the executable instructions to implement a method of object movement control, the method comprising:

in response to a hand gesture of a hand of a user being a predefined selection gesture, determining a target object corresponding to the hand gesture, a corresponding operation for the hand gesture having a requirement of an identification time order;

in response to the predefined selection gesture being detected, displaying, adjacent to the hand of the user, a visual cue indicating that the target object is selected;

in response to the hand gesture of the hand of the user changing to a predefined movement confirmation gesture that indicates an end of a movement of the target object, determining a target display position, the determination of the target display position comprising:

in response to the hand gesture of the hand of the user changing to a predefined fetch gesture, determining that a current hand position of the hand of the user is the target display position;

displaying the target object at the current hand position of the hand of the user, achieving a visual effect of fetch controlling of the target object by a sudden rapid transformation of the target display position from an initial display position of the target object to the current hand position of the hand of the user; and restoring the target object to an initial display state, wherein in response to the predefined movement confirmation gesture being identified after identifying the predefined selection gesture, determining that the predefined movement confirmation gesture has been effectively obtained and determining the end of the movement.

15. The electronic device according to claim 14, wherein before in response to the hand gesture of the hand of the user changing to the predefined movement confirmation gesture, the method further comprises:

in response to the hand gesture of the hand of the user being a predefined drag gesture, determining a real-time movement displacement of the hand of the user; and moving the target object according to the real-time movement displacement.

16. The electronic device according to claim 15, wherein in a case that the predefined drag gesture is a first predefined drag gesture, moving the target object according to the real-time movement displacement further comprises:

displaying a predefined association model of the target object at a corresponding real-time hand position by following a real-time hand position of the hand of the user; and displaying, between the predefined association model and the target object, an association animation for the predefined association model and the target object in real-time.

17. The electronic device according to claim 15, wherein in a case that the predefined drag gesture is a second predefined drag gesture, moving the target object according to the real-time movement displacement further comprises:

displaying, between the hand of the user and the target object, a first direction indication model in real-time, wherein a starting point of the first direction indication model corresponds to a real-time hand position of the hand of the user, and an end point of the first direction indication model corresponds to a real-time object position of the target object.

18. The electronic device according to claim 14, further comprising:

in response to the hand gesture of the hand of the user changing to a predefined drag-release gesture, determining that a current object position of the target object is the target display position.

19. The electronic device according to claim 14, wherein before in response to the hand gesture of the hand of the user being the predefined selection gesture, and before in response to the hand gesture of the hand of the user changing to the predefined movement confirmation gesture, the method further comprises:

identifying the hand gesture of the hand of the user.

20. A non-transitory computer-readable storage medium, wherein the computer-readable storage stores a computer program that implements a method of object movement control, the method comprising:

in response to a hand gesture of a hand of a user being a predefined selection gesture, determining a target object corresponding to the hand gesture, a corresponding operation for the hand gesture having a requirement of an identification time order;

in response to the predefined selection gesture being detected, displaying, adjacent to the hand of the user, a visual cue indicating that the target object is selected;

in response to the hand gesture of the hand of the user changing to a predefined movement confirmation gesture that indicates an end of a movement of the target object, determining a target display position, the determination of the target display position comprising:

in response to the hand gesture of the hand of the user changing to a predefined fetch gesture, determining that a current hand position of the hand of the user is the target display position;

displaying the target object at the current hand position of the hand of the user, achieving a visual effect of fetch controlling of the target object by a sudden rapid transformation of the target display position from an initial display position of the target object to the current hand position of the hand of the user; and restoring the target object to an initial display state, wherein in response to the predefined movement confirmation gesture being identified after identifying the predefined selection gesture, determining that the predefined movement confirmation gesture has been effectively obtained and determining the end of the movement.

* * * * *